United States Patent
Aerrabotu et al.

(10) Patent No.: US 7,489,930 B2
(45) Date of Patent: Feb. 10, 2009

(54) APPARATUS AND METHOD FOR MULTIMODE TERMINALS

(75) Inventors: Naveen Aerrabotu, Gurnee, IL (US); Scott T. Droste, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 558 days.

(21) Appl. No.: 10/857,242

(22) Filed: May 28, 2004

(65) Prior Publication Data

US 2005/0266845 A1     Dec. 1, 2005

(51) Int. Cl.
*H04Q 7/20* (2006.01)
(52) U.S. Cl. .............. 455/439; 455/11.1; 455/445
(58) Field of Classification Search ......... 455/439, 455/11.1, 445
See application file for complete search history.

(56) References Cited

U.S. PATENT DOCUMENTS

| | | | |
|---|---|---|---|
| 5,915,221 A * | 6/1999 | Sawyer et al. ............ 455/437 |
| 6,119,005 A * | 9/2000 | Smolik ..................... 455/436 |
| 6,188,904 B1 * | 2/2001 | Marsan ..................... 455/450 |
| 2003/0002525 A1 | 1/2003 | Grilli et al. |
| 2003/0092444 A1 | 5/2003 | Sengodan et al. |
| 2003/0109256 A1 | 6/2003 | Holcman |
| 2003/0190916 A1 * | 10/2003 | Celedon et al. ............ 455/437 |
| 2004/0092259 A1 * | 5/2004 | Blanc et al. ............. 455/432.1 |
| 2004/0203882 A1 * | 10/2004 | Laiho et al. ............. 455/456.1 |
| 2005/0020203 A1 * | 1/2005 | Losh et al. ................. 455/11.1 |
| 2005/0070291 A1 * | 3/2005 | Shi ........................... 455/445 |
| 2005/0176445 A1 * | 8/2005 | Qu et al. ..................... 455/458 |

* cited by examiner

*Primary Examiner*—Lester Kincaid
*Assistant Examiner*—Charles Shedrick
(74) *Attorney, Agent, or Firm*—Gary J. Cunningham (57) ABSTRACT

An apparatus and method of operation of a multimode terminal on different network technologies. A wireless communication device can operate on a serving cell of a first network type. A neighbor list is received. The neighbor list is modified based on a preferred list to generate a modified neighbor list. Cell measurements are taken of cells of a first network type and cells of a second network type based on the modified neighbor list.

19 Claims, 5 Drawing Sheets

APPARATUS AND METHOD FOR MULTIMODE TERMINALS

BACKGROUND

1. Field

The present disclosure is directed to a method and apparatus for multimode terminals. More particularly, the present disclosure is directed to operation of a multimode terminal on different network technologies.

2. Description of Related Art

Presently, the wireless world is experiencing changes in terms of network deployments. In the past, certain areas of the world deployed global system for mobile communication (GSM) networks and other areas employed code division multiple access technology. Currently, with the increasing popularity of code division multiple access (CDMA) technology, these networks are being deployed in GSM-centric geographies, such as China. Also, GSM technology is being deployed in areas, such as the United States, where CDMA is currently in use.

When multiple technological networks co-exist in the same geographical region, multimode terminals can operate on the co-existing networks. To that end, seamless roaming is desired between the networks. Such seamless roaming is currently handled through the operator agreements. The introduction of the removable user interface module (R-UIM) in CDMA, in light of multimode terminals, brings in challenges for seamless mobility if the CDMA R-UIM and the GSM subscriber identity module (SIM) belong to non-cooperative networks.

For example, a multimode terminal can have subscriptions to both GSM and CDMA networks. However the two networks may not be co-operative networks and the information of a subscription on one network may not be known to the other network. In this scenario, it would be useful to optimize the mobile's scanning process based on a received neighbor list because otherwise a serving network could try to authenticate the mobile on a wrong network. This authentication attempt would thus fail and it would be necessary to abort the handoff process.

Thus, mobile initiated handoff across the technological boundaries between different technological networks is a complex issue if the network to be handed off to belongs to a non-cooperative network. Furthermore, problems exist because mobile initiated handoff across technological boundaries unduly increases the time required for handoff.

BRIEF DESCRIPTION OF THE DRAWINGS

The embodiments of the present invention will be described with reference to the following figures, wherein like numerals designate like elements, and wherein.

DETAILED DESCRIPTION

Figure 1:
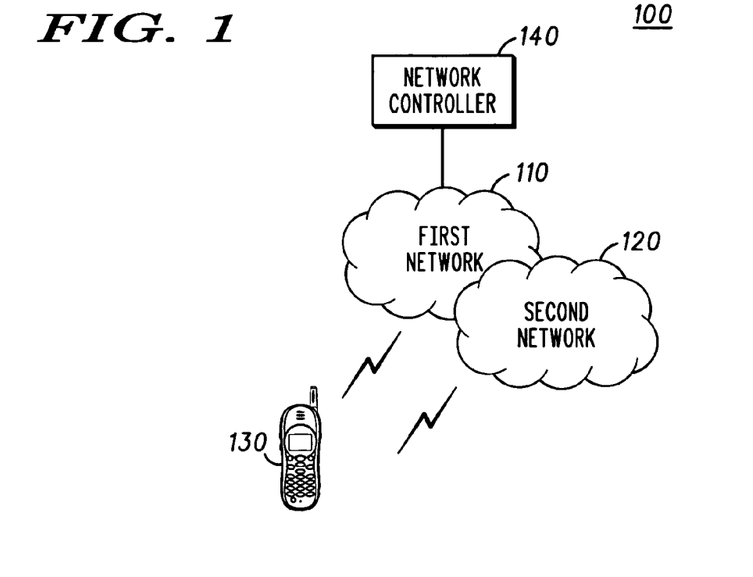
FIG. 1 is an exemplary block diagram of a system according to one embodiment.

FIG. 1 is an exemplary block diagram of a system 100 according to one embodiment. The system 100 includes a network controller 140, a first network 110, a second network 120, and at least one terminal 130. The terminal 130 may be a wireless telephone, a cellular telephone, a personal digital assistant, a pager, a personal computer, a mobile communication device, or any other device that is capable of sending and receiving communication signals on a network including wireless network.

In an exemplary embodiment, the network controller 140 is connected to the first network 110. The controller 140 may also be located at the second network 120, at a base station, at a radio network controller, or anywhere else in the system 100. The controller 140 can control operations on the first network 110, the second network 120, or anywhere else in the system 100. The networks 110 and 120 may include any type of network that is capable of sending and receiving signals, such as wireless signals. For example, the networks 110 and 120 may include a wireless telecommunications network, a cellular telephone network, a satellite communications network, and other like communications systems. As another example, the first network 110 can be of a different network technology than the second network 120. In particular, the first network 110 may be a code division multiple access (CDMA) network and the second network may be a global system for mobile communication (GSM) network, or vice versa. Alternately, the first network 110 or the second network 120 can be a time division multiple access (TDMA) network, a wireless local area network (WLAN), or any other network technology. Furthermore, the networks 110 and 120 may include more than one network and may include a plurality of different types of networks. Thus, the networks 110 and 120 may include a plurality of data networks, a plurality of telecommunications networks, a combination of data and telecommunications networks and other like communication systems capable of sending and receiving communication signals.

In operation according to one embodiment, the terminal 130 can operate on a serving cell of the first network 110 of a first network type. For example, the network 110 can be a GSM network type, a CDMA network type, a WLAN network type, or any other network type. The terminal 130 can receive a neighbor list from the first network 110. For example, the terminal 130 can receive a neighbor list from the network controller 140 on the first network 110. The terminal 130 can then modify the neighbor list based on a preferred list to generate a modified neighbor list. The terminal 130 can then take cell measurements of cells of a first network type on the first network 110 and cells of a second network type on the second network 120 based on the modified neighbor list. The terminal 130 can send the cell measurements based on the modified neighbor list to the serving cell on the first network 110. The terminal 130 can receive an optimized neighbor list after sending the cell measurements based on the modified neighbor list to the serving cell. The terminal 130 can then take cell measurements of cells of a first network type and cells of a second network type based on the optimized neighbor list. The terminal 130 can receive a handoff message from the serving cell, the handoff message including a newly assigned channel based on the modified list and switch to the newly assigned channel. For example the terminal 130 can switch to a newly assigned channel on the second network 120.

The terminal 130 can generate the modified neighbor list by retrieving a first set of preferred list entries from a first subscriber module, the first subscriber module being a subscriber module for the first network type and retrieving a second set of preferred list entries from a second subscriber module, the second subscriber module being a subscriber module for the second network type. The modified neighbor list can be the union of (the intersection of the neighbor list and the first set of preferred list entries) and (the intersection of the neighbor list and the second set of preferred list entries). Alternately, the modified neighbor list can be based on individual contributions from different preferred list entries. The first subscriber module can be a subscriber identity module and the second subscriber module can be a user identity module or vice versa. The terminal 130 can access information in a second network type subscriber module while operating on the serving cell of the first network type. The terminal 130 can also determine the first network type is a desired network type, send first network type cell measurements to the serving cell, and send modified second network type cell measurements to the serving cell. For example, the terminal 130 may take measurements only for the cells that it needs or prefers. The terminal 130 may send altered or low values for cells of an undesired network type. The terminal 130 may also omit values for cells of an undesired network type. Thus, the terminal 130 can respond to an exhaustive neighbor list with modified data that biases the measurements towards a desired network type. As another example, a terminal 130 may be a multimode terminal that does not have a GSM SIM card. Thus, the terminal 130 may just take and send measurements on CDMA cells and send irrelevant or modified data to the serving cell for the GSM cells.

According to another related embodiment, the controller 140 can send a neighbor list to the terminal 130, such as a wireless communication device, and can receive cell measurements based on a modified neighbor list, the modified neighbor list based on the sent neighbor list. The controller 140 can send an optimized neighbor to the terminal 130 list after receiving the cell measurements based on the modified neighbor list. The terminal 140 can send a handoff message to the terminal 130, the handoff message including a newly assigned channel based on the modified neighbor list.

According to another related embodiment, the terminal's scanning for a new cell can be optimized by using a modified neighbor list. This optimization can positively influence battery life and performance for handoff for multimode terminals. The optimized scan can enable the first network 110 to handoff the terminal to the second network 120, such as a non-cooperative network. The result is that the terminal 130 can have a greater chance of getting authenticated using an optimized scan and measurements.

Figure 2:
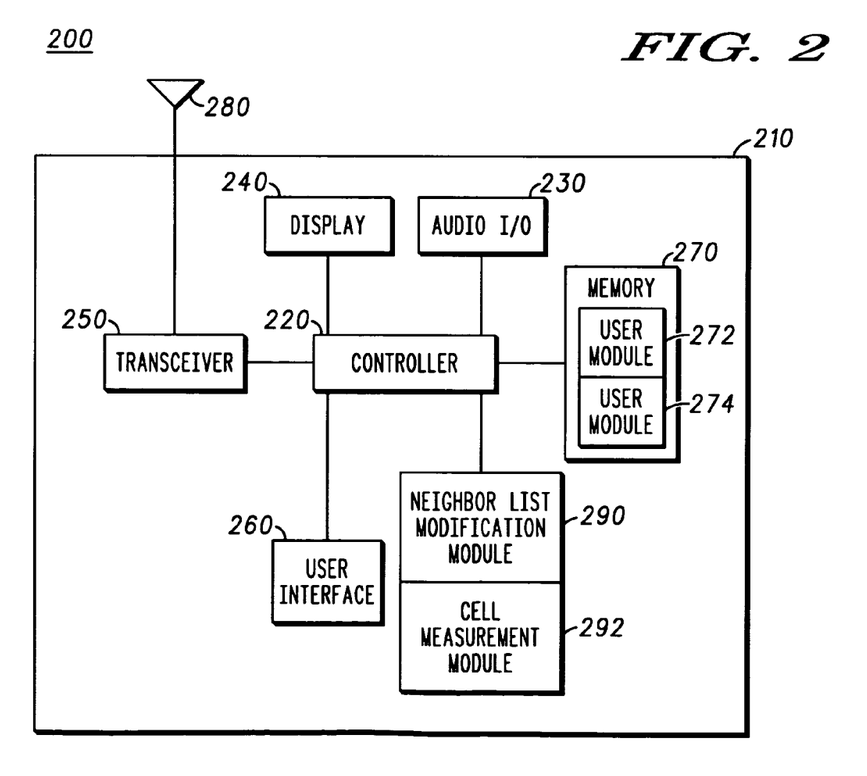
FIG. 2 is an exemplary block diagram of a wireless communication device according to one embodiment.

FIG. 2 is an exemplary block diagram of a wireless communication device 200, such as the terminal 130, according to one embodiment. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, and an antenna 280 coupled to the housing 210 and the transceiver 250. The wireless communication device 200 can also include a neighbor list modification module 290 and a cell measurement module 292. The neighbor list modification module 290 and the cell measurement module 292 can be coupled to the controller 220, can reside within the controller 220, can reside within the memory 270, can be autonomous modules, can be software, can be hardware, or can be in any other format useful for a module on a wireless communication device 200. The wireless communication device 200 can also include a first user or subscriber module 272 and a second user or subscriber module 274. The user modules 272 and 274 can reside within the memory 270 or can be autonomous. The user modules 272 and 274 may or may not be removable. For example, a user module 272 may be a user identity module, a removable user identity module, a subscriber identity module, or any other useful user module. The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and a electronic device. The memory 270 may include a random access memory, a read only memory, an optical memory, a subscriber identity module memory, or any other memory that can be coupled to a mobile communication device.

In operation, the controller 220 can be configured to operate the wireless communication device on a serving cell of a first network type and a serving cell of a second network type. The transceiver 250 can receive a neighbor list. The neighbor list modification module 290 can modify the neighbor list based on a preferred list to generate a modified neighbor list. The preferred list can be stored in the memory 270. Also, different portions of the preferred list can be stored in each user module 272 and 274. The cell measurement module 292 can scan for and/or take cell measurements of cells of a first network type and cells of a second network type based on the modified neighbor list. The transceiver 250 can send the cell measurements based on the modified neighbor list to the serving cell. The transceiver 250 can then receive an optimized neighbor list after sending the cell measurements based on the modified neighbor list to the serving cell. The cell measurement module 292 can then take cell measurements of cells of a first network type and cells of a second network type based on the optimized neighbor list.

The transceiver 250 can receive a handoff message from the serving cell, the handoff message including a newly assigned channel based on the modified list. The controller 220 can then operate the wireless communication device on the newly assigned channel. The neighbor list modification module 290 can generate the modified neighbor list by retrieving a first set of preferred list entries from the first subscriber module 272, the first subscriber module 272 being a subscriber module for the first network type, and retrieving a second set of preferred list entries from a second subscriber module 274, the second subscriber module 274 being a subscriber module for the second network type. The modified neighbor list can include the union of (the intersection of the neighbor list and the first set of preferred list entries) and (the intersection of the neighbor list and the second set of preferred list entries).

The controller 220 can access information in a second network type subscriber module, such as second user module 274, while operating on the serving cell of the first network type. The first network type can be a code division multiple access network type, a global system for mobile communication network type, a time division multiple access network type, a wireless local area network type, or any other network type. The second network type can be a code division multiple access network type, a global system for mobile communication network type, a time division multiple access network type, a wireless local area network type, or any other network type. The controller 220 may also determine the first network type is a desired network type, send first network type cell measurements to the serving cell, and send modified second network type cell measurements to the serving cell.

Figure 3:
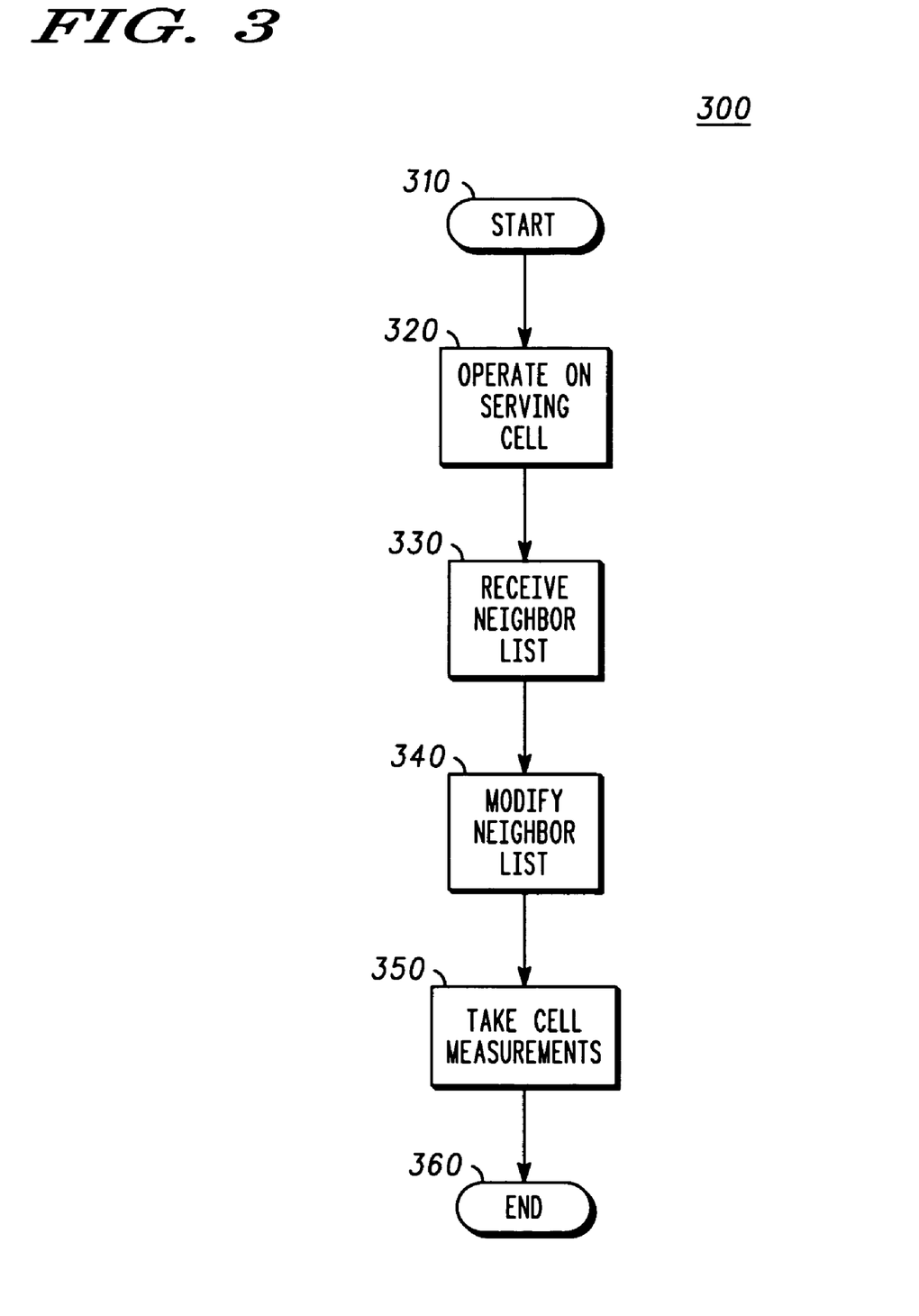
FIG. 3 is an exemplary flowchart illustrating the operation of a wireless communication device according to one embodiment.

FIG. 3 is an exemplary flowchart 300 illustrating the operation of the wireless communication device 200 according to another embodiment. In step 310, the flowchart begins. In step 320, the wireless communication device 200 operates on a serving cell of a first network type. In step 330, the wireless communication device 200 receives a neighbor list. In step 340, the wireless communication device 200 modifies the neighbor list based on a preferred list to generate a modified neighbor list. In step 350, the wireless communication device 200 takes cell measurements of cells of a first network type and cells of a second network type based on the modified neighbor list. In step 360, the flowchart 300 ends.

Figure 4:
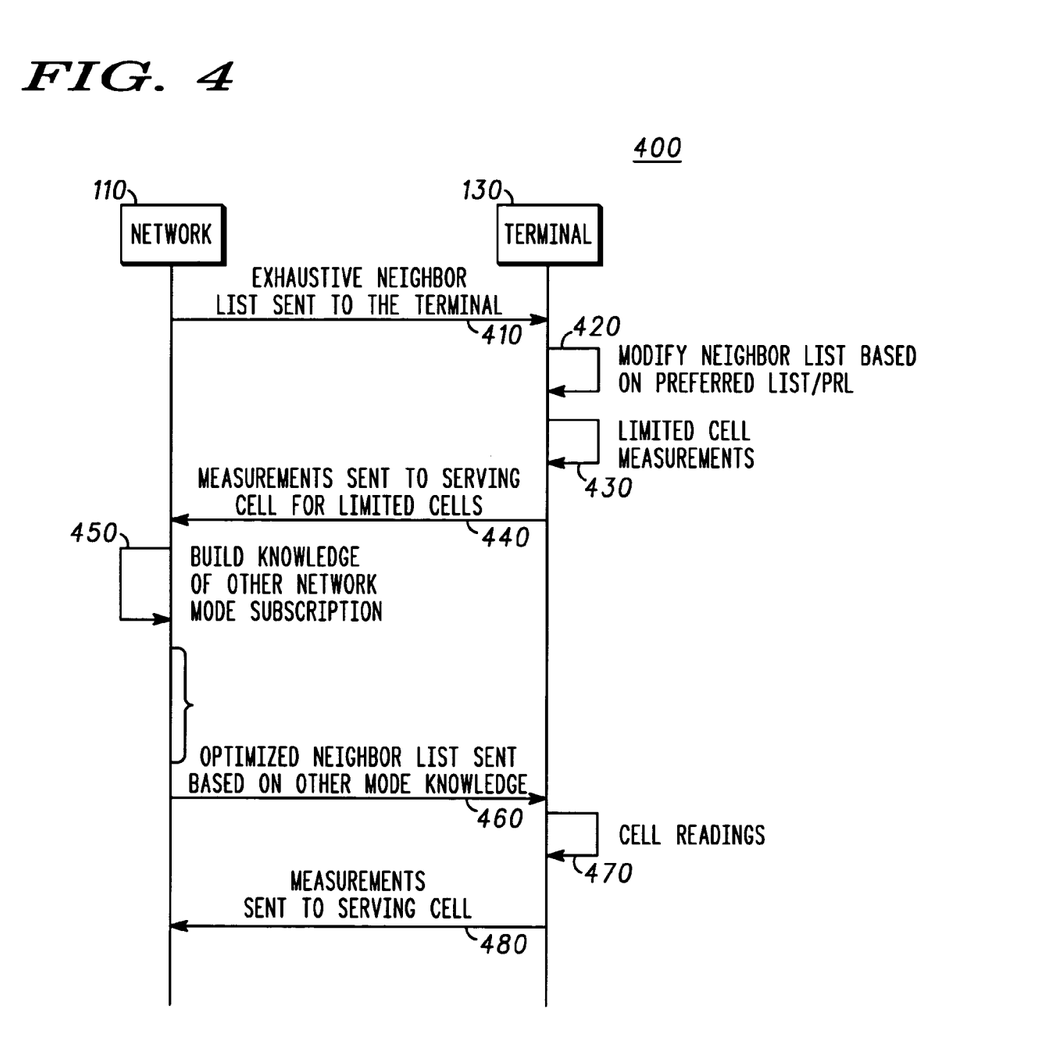
FIG. 4 is an exemplary flow diagram outlining the operation of the elements of the system according to one embodiment.

FIG. 4 is an exemplary flow diagram 400 outlining the operation of the elements of the system 100 according to one embodiment. In one example of this embodiment, the network 110 may be a CDMA network and the terminal 130 can already be on a call on the network 110. In step 410, a controller on the network 110, such as the controller 140 located at a base station, can send a neighbor list to the terminal 130 and instruct the mobile to scan and report back radio measurements of the cells in the neighbor list in an attempt to prepare for the handoff. The neighbor list can contain cells of another network technology, such as GSM cells, on the second network 120. In step 420, the terminal 130 can generate a modified neighbor list by pre-processing the neighbor list based on a preferred list located in the memory 270 or on at least one user module 272, such as a GSM SIM card, and based on a preferred list in the memory 270 or including a CDMA preferred roaming list on a user module 274. In step 430, the terminal 130 can take cell radio measurements based on the modified neighbor list. For example, the terminal 130 can scan for a cross technology network based on a multimode scan timer. The terminal 130 can look for networks when the timer expires and based on a preferred list for GSM and a preferred roaming list (PRL) for CDMA. Alternately, the terminal 130 can alternate scanning based on a designated priority for CDMA and GSM. For example, the scanning can begin from a preferred system. During this process, the terminal 130 can cache both the preferred list from SIM and the PRL if needed to enable the scanning. In step 440, the terminal 130 can report the cell measurements of where it can get authenticated based on its service. In step 450, the network 110 may build knowledge of the terminal's ability to use another network type. Based on this knowledge, in step 460, the network 110 can send an optimized neighbor list to the terminal 130. The terminal 130 can take additional cell readings and/or measurements in step 470. In step 480, the terminal 130 can send additional measurements to the network 110. The network 110 can then instruct a handoff to another cell to hand-off the terminal 130 to the other cell. This may be a cell of another network type on another network 120, such as a GSM cell. The call can then be handed off to another cell in the second network 120. As mentioned above, different networks of different types can hand off the cell to other networks of other types, such as CDMA, TDMA, GSM, WLAN, or any other wireless communication technology.

Figure 5:
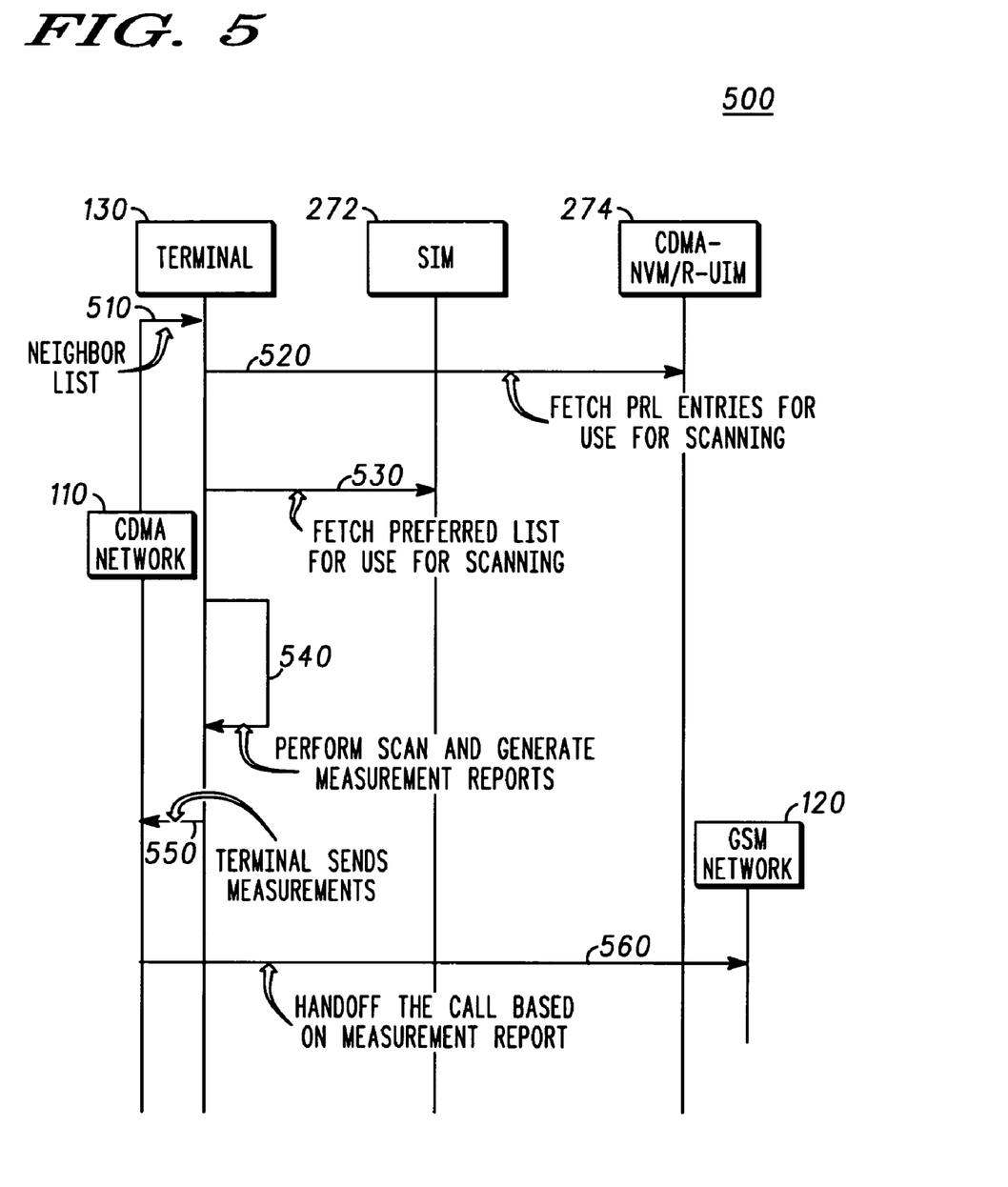
FIG. 5 is an exemplary flow diagram outlining the operation of the elements of the system according to another embodiment.

FIG. 5 is an exemplary flow diagram 500 outlining the operation of the elements of the system 100 according to another related embodiment. In step 510, the first network 110, such as a CDMA network, can send a neighbor list to the terminal 130. In step 520, the terminal 130 can fetch a preferred roaming list from the second user module 274, such as a CDMA removable UIM. In step 530, the terminal 130 can fetch a preferred list from the first user module 272, such as a subscriber identity module. The terminal 130 can then use the entries from the preferred roaming list and the preferred list to select entries from the neighbor list and generate a modified neighbor list to scan and take measurements in step 540. In step 550, the terminal 130 can send the measurements based on the modified neighbor list to the first network 110. The first network 110 can select a network, such as the second network 120 that can be a GSM network, for handoff based on the measurements. In step 560, the first network 110 can send a handoff request to the second network 120 based on the measurement report.

Figure 6:
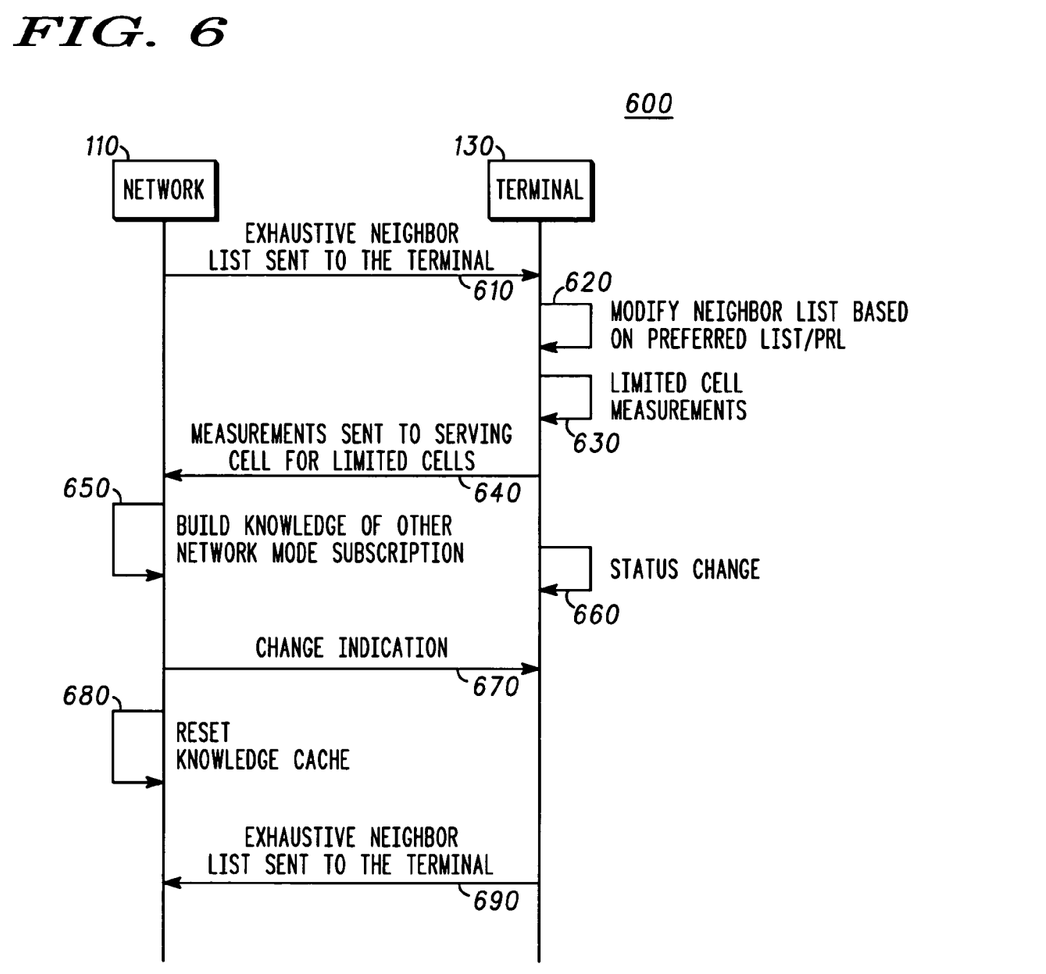
FIG. 6 is an exemplary flow diagram outlining the operation of the elements of the system according to another embodiment.

FIG. 6 is an exemplary flow diagram 600 outlining the operation of the elements of the system 100 according to another related embodiment. In step 610, a serving cell in the network 110 can send a neighbor list to the terminal 130. In step 620, the terminal 130 can modify the neighbor list based on a preferred list to generate a modified neighbor list. In step 630, the terminal 130 can perform cell measurements on the cells in the modified neighbor list. In step 640, the terminal 130 can send the measurements to the serving cell in the network 110. Based on the measurements, in step 650, network 110 acquires the knowledge that the terminal 130 is operable on certain networks. In step 660, the terminal 130 may experience a status change. For example, a user of the terminal 130 may replace one of the user modules 272 or 274. As another example, the terminal 130 may receive over-the-air service provisioning that changes a preferred list located in a memory 270 or in a user module 272 or 274 on the terminal 130. In step 670, the terminal 130 can report the status change to the network 110. In step 680, the network 110 can reset its knowledge cache based on the change indication. In step 690, the network 110 can send a neighbor list to the terminal 130 and the process can begin again.

The method of this invention is preferably implemented on a programmed processor. However, the controllers, flowcharts, and modules may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this invention.

While this invention has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the invention by simply employing the elements of the independent claims. Accordingly, the preferred embodiments of the invention as set forth herein are intended to be illustrative, not limiting. Various changes may be made without departing from the spirit and scope of the invention.

What is claimed is:

1. A method in a wireless communication device, the method comprising:

operating on a serving cell of a first network type;
receiving a neighbor list;
modifying the neighbor list based on a preferred list to generate a modified neighbor list, by:
retrieving a first set of preferred list entries from a first subscriber module, the first subscriber module being a subscriber module for the first network type; and
retrieving a second set of preferred list entries from a second subscriber module, the second subscriber module being a subscriber module for the second network type, wherein the modified neighbor list comprises the union of the intersection of the neighbor list and the first set of preferred list entries and the intersection of the neighbor list and the second set of preferred list entries; and
taking cell measurements of cells of a first network type and cells of a second network type based on the modified neighbor list,
wherein the first network type is a global system for mobile communication network type, and
wherein the second network type is a code division multiple access network type,
wherein the method further comprises:
sending the cell measurements based on the modified neighbor list to the serving cell,
receiving an optimized neighbor list after sending the cell measurements based on the modified neighbor list to the serving cell; and
taking cell measurements of cells of a first network type and cells of a second network type based on the optimized neighbor list.

2. The method according to claim 1, further comprising:
receiving a handoff message from the serving cell, the handoff message including a newly assigned channel based on the modified list; and
switching to the newly assigned channel.

3. The method according to claim 1, wherein the first subscriber module is a subscriber identity module and wherein the second subscriber module is a user identity module.

4. The method according to claim 1, wherein the first subscriber module is a user identity module and wherein the second subscriber module is a subscriber identity module.

5. The method according to claim 1, further comprising accessing information in a second network type subscriber module while operating on the serving cell of the first network type.

6. The method according to claim 1, wherein the preferred list is stored on the wireless communication device.

7. The method according to claim 1, further comprising:
determining the first network type is a desired network type;
sending first network type cell measurements to the serving cell; and
sending modified second network type cell measurements to the serving cell.

8. A wireless communication device comprising:
a controller configured to operate the wireless communication device on a serving cell of a first network type and a sewing cell of a second network type;
a receiver configured to receive a neighbor list;
a neighbor list modification module configured to modify the neighbor list based on a preferred list to generate a modified neighbor list;
a cell measurement module configured to take cell measurements of cells of a first network type and cells of a second network type based on the modified neighbor list,
wherein the first network type comprises a first air interface technology and the second network type comprises a second air interface technology different from the first air interface technology,
wherein the wireless communication device further comprises a transmitter configured to send the cell measurements based on the modified neighbor list to the serving cell,
wherein the receiver is further configured to receive an optimized neighbor list after the transmitter sends the cell measurements based on the modified neighbor list to the serving cell; and
wherein the cell measurement module is further configured to take cell measurements of cells of a first network type and cells of a second network type based on the optimized neighbor list; and
a first subscriber module; and
a second subscriber module,
wherein the neighbor list modification module is further configured to generate the modified neighbor list by:
retrieving a first set of preferred list entries from the first subscriber module, the first subscriber module being a subscriber module for the first network type; and
retrieving a second set of preferred list entries from the second subscriber module, the second subscriber module being a subscriber module for the second network type, wherein the modified neighbor list comprises the union of the intersection of the neighbor list and the first set of preferred list entries and the intersection of the neighbor list and the second set of preferred list entries.

9. The wireless communication device according to claim 8,
wherein the receiver is further configured to receive a handoff message from the serving cell, the handoff message including a newly assigned channel based on the modified list; and
wherein the controller is further configured to operate the wireless communication device on the newly assigned channel.

10. The wireless communication device according to claim 8, wherein the first subscriber module is a subscriber identity module and wherein the second subscriber module is a user identity module.

11. The wireless communication device according to claim 8, wherein the first subscriber module is a user identity module and wherein the second subscriber module is a subscriber identity module.

12. The wireless communication device according to claim 8, wherein the controller is further configured to access information in a second network type subscriber module while operating on the serving cell of the first network type.

13. The wireless communication device according to claim 8,
wherein the first network type is a code division multiple access network type, and
wherein the second network type is a global system for mobile communication network type.

14. The wireless communication device according to claim 8,
wherein the first network type is a global system for mobile communication network type, and wherein the second network type is a code division multiple access network type.

15. The wireless communication device according to claim 8, further comprising a memory,
wherein the preferred list is stored in the memory.

16. The wireless communication device according to claim 8, wherein the controller is further configured to determine the first network type is a desired network type, send first network type cell measurements to the serving cell, and send modified second network type cell measurements to the serving cell.

17. A method in a wireless communication device, the method comprising:
operating on a serving cell of a first network type;
receiving a neighbor list;
modifying the neighbor list based on a preferred list stored in a memory of the wireless communication device to generate a modified neighbor list, by:
retrieving a first set of preferred list entries from a first subscriber module, the first subscriber module being a subscriber module for the first network type; and
retrieving a second set of preferred list entries from a second subscriber module, the second subscriber module being a subscriber module for the second network type, wherein the modified neighbor list comprises the union of the intersection of the neighbor list and the first set of preferred list entries and the intersection of the neighbor list and the second set of preferred list entries;
taking cell measurements of cells of a first network type and cells of a second network type based on the modified neighbor list,
wherein the first network type comprises a first air interface technology and the second network type comprises a second air interface technology different from the first air interface technology.

18. The method according to claim 17, further comprising:
sending the cell measurements based on the modified neighbor list to the serving cell;
receiving a handoff message from the serving cell, the handoff message including a newly assigned channel based on the modified list; and
switching to the newly assigned channel.

19. The method according to claim 17, further comprising accessing information in a second network type subscriber module while operating on the serving cell of the first network type.

* * * * *